United States Patent
Oswald

(10) Patent No.: US 6,585,034 B2
(45) Date of Patent: Jul. 1, 2003

(54) HEAT EXCHANGER

(75) Inventor: James I Oswald, Hinckley (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/060,298

(22) Filed: Feb. 1, 2002

(65) Prior Publication Data

US 2002/0112844 A1 Aug. 22, 2002

(30) Foreign Application Priority Data

Feb. 21, 2001 (GB) ............................................. 0104340

(51) Int. Cl.⁷ ............................................. F28D 19/00
(52) U.S. Cl. ........................ 165/10; 165/166; 165/170; 165/4
(58) Field of Search ................................ 165/166, 167, 165/10, 4, 146, 170

(56) References Cited

U.S. PATENT DOCUMENTS

| 2,657,018 A | * 10/1953 | Simpelaar | 165/166 |
| 3,007,680 A | * 11/1961 | Harris | 165/166 |
| 4,203,205 A | 5/1980 | Jouet | |
| 4,301,862 A | * 11/1981 | McAlister | 165/166 |
| 5,797,449 A | * 8/1998 | Oswald et al. | 165/165 |
| 6,170,568 B1 | * 1/2001 | Valenzuela | 165/167 |
| 6,192,975 B1 | * 2/2001 | Yanai et al. | 165/165 |

FOREIGN PATENT DOCUMENTS

| EP | 239490 A | 9/1987 |
| EP | 798527 A | 10/1997 |
| GB | 2156961 A | 10/1985 |

* cited by examiner

*Primary Examiner*—Henry Bennett
*Assistant Examiner*—Terrell McKinnon
(74) *Attorney, Agent, or Firm*—W. Warren Taltavull; Manelli, Denison & Selter PLLC

(57) ABSTRACT

The spiral heat exchanger (10) has a hot end (16) and a cold end (18) arranged at opposite ends of the heat exchanger (10). A first, relatively hot, fluid is supplied to the hot end (16) of the heat exchanger (10) and the first fluid is removed from the cold end (18) of the heat exchanger (10). The heat exchanger (10) comprises first and second metal sheets (12,14). Each metal sheet (12,14) has hot and cold edge portions (18,20) at the hot and cold ends (16,18) respectively of the heat exchanger (10). Both of the hot and cold edge portions (18) of the first metal sheet (12) are thinner and have a greater diameter than the remainder of the first metal sheet (12) such that both of the hot and cold edge portions (18) contact the hot and cold edge portions (20) of the second sheet (14). The hot and cold edge portions (18) of the first metal sheet are joined to the hot and cold edge portions (20) of the second metal sheet (14).

23 Claims, 2 Drawing Sheets

HEAT EXCHANGER

FIELD OF THE INVENTION

The present invention relates to a heat exchanger and in particular to a plate fin heat exchanger or a primary surface heat exchanger.

BACKGROUND OF THE INVENTION

Plate fin type heat exchangers generally comprise a plurality of plates, and a plurality of fins extend between and may be secured to each adjacent pair of plates. The fins may be secured to the plates by brazing, welding, diffusion bonding etc. Alternatively the fins may not be secured to the plates. The fins are defined by corrugated plates. In plate fin type heat exchangers the fins define the passages for the flow of fluids to be put into heat exchange relationship.

Primary surface type heat exchangers generally comprise a plurality of plates and a plurality of spacers extend between each adjacent pair of plates to separate the plates. In primary surface type heat exchangers the plates define passages for the flow of fluids to be put into heat exchange relationship.

Gas turbine engines comprise a compressor, a combustion chamber and a turbine arranged in flow series. The compressor compresses air and supplies it to the combustion chamber. Fuel is burnt in air in the combustion chamber to produce hot gases, which drive the turbine. The turbine drives the compressor and also drives a generator, a pump, a shaft or other load.

Heat exchangers are used in industrial gas turbine engines to return heat from the hot gases leaving the gas turbine engine to the compressed air leaving the compressor before it enters the combustion chamber. These heat exchangers are also known as recuperators, or regenerators. The recuperator heat exchanger increases the efficiency of the gas turbine engine and the hotter the air entering the combustion chamber the greater is the fuel saving.

The use of a spiral heat exchanger for a gas turbine engine recuperator is known from our European Patent EP0753712B1 and this may be a plate fin type heat exchanger or a primary surface heat exchanger.

A spiral heat exchanger, for example, is manufactured from two sheets of metal which are wound together into a spiral and the edges of the sheets of metal are joined together. The sheets of metal may be stainless steel for low temperature spiral heat exchangers or nickel base alloy for high temperature spiral heat exchangers.

One problem with the manufacture of spiral heat exchangers is ensuring close contact between the edges of the sheets of metal to enable the sheets of metal to be joined together to form a seal.

SUMMARY OF THE INVENTION

Accordingly the present invention seeks to provide a novel heat exchanger which reduces, preferably overcomes, the above mentioned problems.

Accordingly the present invention provides a heat exchanger having a hot end and a cold end, the heat exchanger comprising a first sheet and a second sheet, the first and second sheets being wound around an axis, the hot and cold ends of the heat exchanger being arranged at the axial ends of the heat exchanger, each sheet having hot and cold edge portions at the hot and cold ends respectively of the heat exchanger, at least one of the hot and cold edge portions of the first sheet being thinner and having a greater diameter than the remainder of the first sheet such that the at least one of the hot and cold edge portions of the first sheet contacts at least one of the hot and cold edge portions of the second sheet, the hot and cold edge portions of the first sheet being joined to the hot and cold edge portions of the second sheet.

Preferably both of the hot and cold edge portions of the first sheet are thinner and have a greater diameter than the remainder of the first sheet such that both of the hot and cold edge portions of the first sheet contact the hot and cold edge portions of the second sheet.

The heat exchanger may be a primary surface heat exchanger. Alternatively the heat exchanger may be a plate fin heat exchanger. At least one corrugated sheet may be arranged between the first and second sheets.

Preferably the edge portions of the sheets are joined by welded joints, brazed joints, bonded joints, crimped joints or glued joints.

Preferably the first sheet comprises a metal or alloy. Preferably the second sheet comprises a metal or alloy. Preferably the alloy comprises a nickel base alloy or steel. Preferably the alloy comprises stainless steel.

Preferably the heat exchanger is a spiral heat exchanger.

The present invention also provides a method of manufacturing a heat exchanger, the heat exchanger having a hot end and a cold end, the hot and cold ends of the heat exchanger being arranged at the axial ends of the heat exchanger, comprising forming a first sheet, the first sheet having hot and cold edge portions, thinning at least one of the hot and cold edge portions of the first sheet such that the at least one of the hot and cold edge portions is thinner and longer than the remainder of the first sheet, forming a second sheet, the second sheet having hot and cold edge portions, winding the first and second sheets together around an axis such that the first sheet is within the second sheet and such that the at least one of the hot and cold edge portions of the first sheet has a greater diameter than the remainder of the first sheet such that the at least one of the hot and cold edge portions of the first sheet contacts the at least one of the hot and cold edge portions of the second sheet, and joining the hot and cold edge portions of the first sheet to the hot and cold edge portions of the second sheet.

Preferably the method comprises thinning both of the hot and cold edge portions of the first sheet such that both of the hot and cold edge portions are thinner and have a greater diameter than the remainder of the first sheet such that both of the hot and cold edge portions of the first sheet contact the hot and cold edge portions of the second sheet.

The heat exchanger may be a primary surface heat exchanger. Alternatively the heat exchanger may be a plate fin heat exchanger. The method may comprise placing at least one corrugated sheet between the first and second sheets and winding the first and second sheets and the at least one corrugated sheet into a spiral.

Preferably the joining of the edge portions of the first and second sheets comprises welding, brazing, bonding, crimping or gluing.

Preferably the method comprises forming the first sheet from a metal or alloy. Preferably the method comprises forming the second sheet from a metal or alloy. Preferably the alloy comprises a nickel base alloy or steel. Preferably the alloy comprises stainless steel.

Preferably the thinning of the at least one hot and cold edge portion of the first sheet comprises rolling or hammering.

Preferably the first and second sheets are wound into a spiral to form a spiral heat exchanger.

BRIEF DESCRIPTION OF THE DRAWINGS

The present invention will be more fully described by way of example with reference to the accompanying drawings in which:—

DETAILED DESCRIPTION OF THE INVENTION

Figure 1:
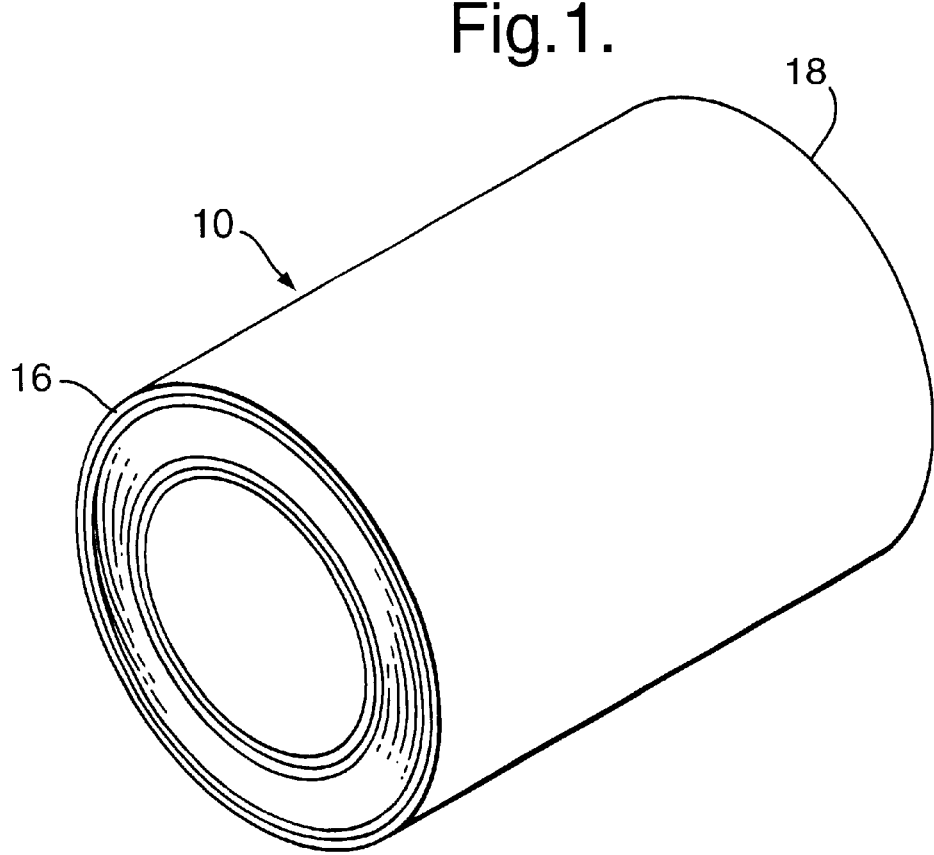
FIG. 1 shows a heat exchanger according to the present invention.
Figure 2:
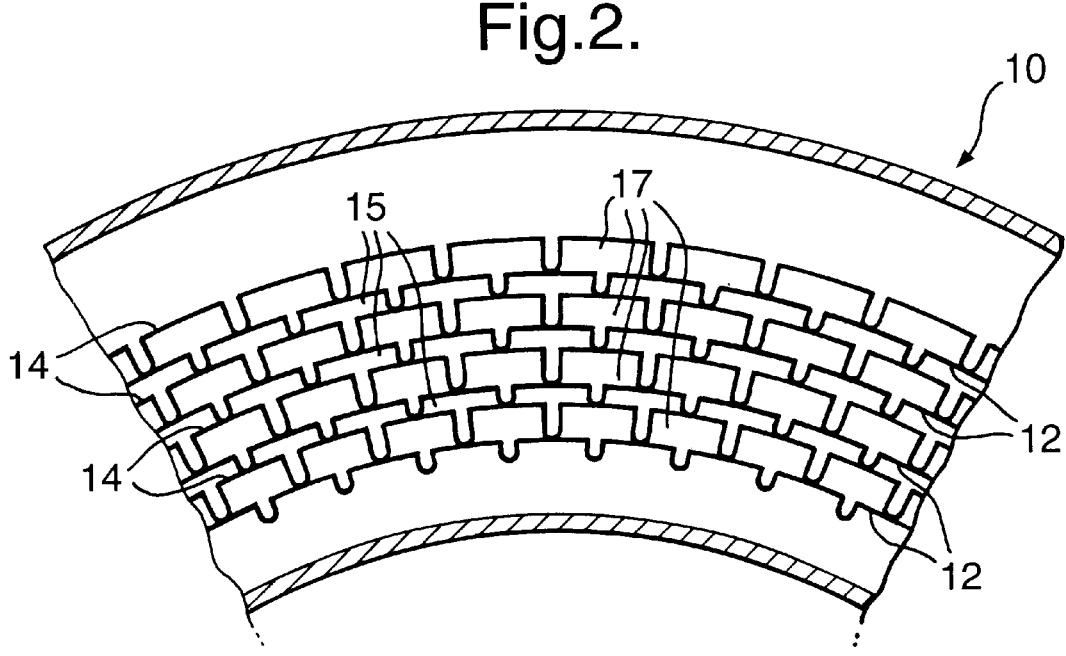
FIG. 2 is a radial cross-sectional view through the heat exchanger shown in FIG. 1.
Figure 3:
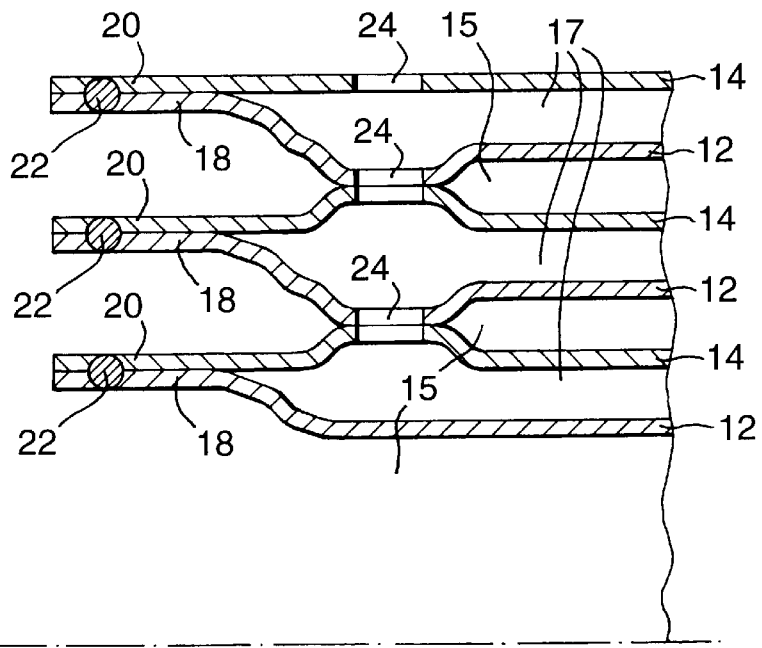
FIG. 3 is an enlarged axial cross-sectional view through a portion of the heat exchanger shown in FIGS. 1 and 2.

A spiral heat exchanger 10 suitable for a gas turbine engine intercooler, regenerator or recuperator is shown in FIGS. 1, 2 and 3. The spiral heat exchanger 10 is annular and comprises a first metal sheet 12 and a second metal sheet 14, which are arranged in a spiral. The spiral heat exchanger 10 has a hot end 16 and a cold end 18 arranged at opposite axial ends of the spiral heat exchanger 10. A first, relatively hot, fluid is supplied to the hot end 16 of the spiral heat exchanger 10 and the first fluid is removed from the cold end 18 of the spiral heat exchanger 10.

The first and second metal sheets 12 and 14 respectively form a primary surface type heat exchanger, as shown in FIG. 2. The first fluid is supplied to an axially extending passage 15 defined between two confronting surfaces of the first and second metal sheets 12 and 14 respectively. A second fluid is supplied to an axially extending passage 17 defined between the other two confronting surfaces of the first and second metal sheets 12 and 14.

Figure 4:
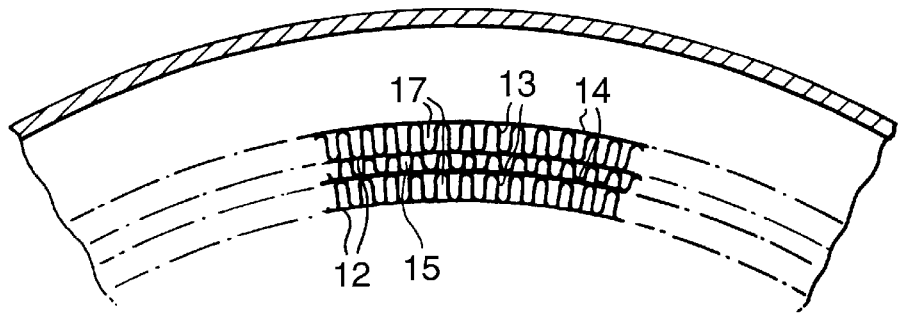
FIG. 4 is an alternative radial cross-sectional view through the heat exchanger shown in FIG. 1.

Alternatively the first and second metal sheets 12 and 14 respectively may form a plate fin type heat exchanger 10B as shown in FIG. 4. The first fluid is supplied to axially extending passages 15 defined by a corrugated sheet 11 between the two confronting surfaces of the first and second metal sheets 12 and 14 respectively. A second fluid is supplied to axially extending passages 17 defined by a corrugated sheet 13 between the other two confronting surfaces of the first and second metal sheets 12 and 14.

Figure 5:
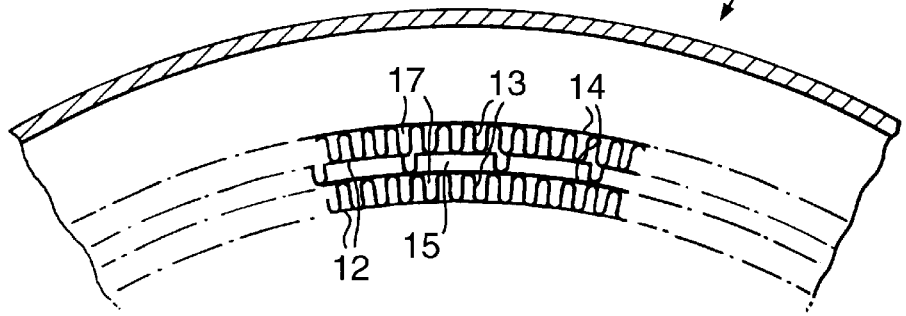
FIG. 5 is a further radial cross-sectional view through the heat exchanger shown in FIG. 1.

Alternatively the first and second metal sheets 12 and 14 respectively may form a combination of a plate type and a plate fin type heat exchanger 10C as shown in FIG. 5. The first fluid is supplied to axially extending passage 15 defined between the two confronting surfaces of the first and second metal sheets 12 and 14 respectively. A second fluid is supplied to axially extending passages 17 defined by a corrugated sheet 13 between the other two confronting surfaces of the first and second metal sheets 12 and 14.

The first metal sheet 12 is radially within the second metal sheet 14 at each respective turn around the axis X of the spiral heat exchanger 10. The first metal sheet 12 has a hot edge portion 20 and a cold edge portion at the hot and cold ends 16 and 18 respectively of the spiral heat exchanger 10, FIG. 3 only shows the hot end 16 of the spiral heat exchanger 10. The second metal sheet 14 has a hot edge portion 22 and a cold edge portion at the hot and cold ends 16 and 18 respectively of the spiral heat exchanger 10. The hot edge portions 20 and 22 of the first and second metal sheets 12 and 14 are joined together to form a seal by a spiral joint 24. The joint 22 may be a welded joint, a brazed joint, a bonded joint or a glued joint. Similarly the cold edge portions (not shown) of the first and second metal sheets 12 and 14 are joined together to form a seal by a spiral joint. This joint may be a welded joint, a brazed joint, a bonded joint or a glued joint.

The hot and cold edge portions 20 of the first metal sheet 12, at each radial plane through the spiral heat exchanger 10, are thinner, circumferentially longer and hence at a greater diameter than the remainder of the first metal sheet 12. In contrast the hot and cold edge portions 22 of the second metal sheet 14, at each radial plane through the spiral heat exchanger 10, are the same thickness, the same circumferential length and hence the same diameter as the remainder of the second metal sheet 14.

Therefore the hot and cold edge portions 20 of the first metal sheet 12 extend radially outwardly towards the hot and cold edge portions 22 respectively of the second metal sheet 14. The thinned hot and cold edge portions 20 of the first metal sheet 12 enable close contact between the hot and cold edge portions 20 of the first metal sheet 12 and the hot and cold edge portions 22 respectively of the second metal sheet 14. This enables the hot and cold edge portions 20 of the first metal sheet 12 to be joined more easily to the hot and cold edge portions 22 respectively of the second metal sheet 14.

Preferably the second fluid is supplied to the axially extending passage 17 by one or more apertures, passages or manifolds 24 extending radially through the first and second metal sheets 12 and 14 at one axial end of the spiral heat exchanger 10. Similarly the second fluid may be removed from the axially extending passage 17 by one or more apertures, passages or manifolds (not shown) extending radially through the first and second metal sheets 12 and 14 at the other axial end of the spiral heat exchanger 10. This is described more fully in our European patent EP0753712B1.

Alternatively the second fluid is supplied to the axially extending passage 17 by one or more manifolds (not shown) extending radially at one axial end of the spiral heat exchanger 10. Similarly the second fluid may be removed from the axially extending passage 17 by one or more manifolds (not shown) extending radially at the other axial end of the spiral heat exchanger 10. These radially extending manifolds supply or remove the second fluid through radially extending, angularly spaced zones, or sectors, where the hot and cold edge portions 20 and 22 are not joined together to allow the flow of the second fluid axially into or out of the axially extending passage 17. The hot and cold edge portions 20 and 22 may have pieces cut away or pieces bent to allow this. This is described more fully in European patent EP0798527B1.

The first and second metal sheets 12 and 14 have a thickness of up to 1 mm but preferably have a thickness of 0.25 mm or less.

The spiral heat exchanger 10 is manufactured by forming the first and second metal sheets 12 and 14 from a suitable metal or suitable alloy. The first and second metal sheets 12 and 14 respectively have hot and cold edge portions 20 and 22. The hot and cold edge portions 20 of the first metal sheet 12 are formed, such that the hot and cold edge portions 20 are thinner and longer than the remainder of the first metal sheet 10.

The first and second metal sheets 10 and 12 are wound together into a spiral such that the first metal sheet 12 is within the second metal sheet 14. Thus the hot and cold edge portions 20 of the first metal sheet 12 have a greater diameter than the remainder of the first metal sheet 12 such that the hot and cold edge portions 20 of the first metal sheet 12 contact the hot and cold edge portions 22 of the second metal sheet 14. The hot and cold edge portions 20 of the first metal sheet 12 are then joined to the hot and cold edge portions 22 of the second metal sheet 14.

In the case of a plate fin type heat exchanger a corrugated metal sheet is placed between the first and second metal sheets 12 and 14 and the first and second metal sheets 12 and 14 and the at least one corrugated sheet are wound together into a spiral.

The hot and cold edge portions 20 and 22 of the first and second metal sheets 12 and 14 respectively are joined by welding, brazing, bonding, crimping or gluing.

The alloy comprises a nickel base alloy or steel, preferably the steel comprises a stainless steel.

The hot and cold edge portions 18 of the first metal sheet 12 are thinned by rolling or hammering.

The spiral heat exchanger 10 is able to accommodate the difference in thermal expansion coefficients of the metals, or alloys, of the first and second metal sheet portions 20 and 22 because the spiral heat exchanger 10 is manufactured from the curved first and second metal sheets 12 and 14 and this gives it excellent thermal flexibility.

Although the invention has been described with reference to a recuperator, the invention may be applied to an intercooler or other type of heat exchanger. Although the invention has been described with reference to a gas turbine engine heat exchanger, the invention may be applicable to heat exchangers for other engines or other purposes.

Although the invention has been described with reference to metal sheets the invention may be applied to other sheets, for example plastic sheets or ceramic sheets.

Although the invention has described both of the hot and cold edge portions of the first metal sheet being thinner and having a greater diameter than the remainder of the first metal sheet it may be possible for only one of the hot and cold edge portions to be thinner and have a greater diameter than the remainder of the first metal sheet.

Although the invention has described the whole of both of the hot and cold edge portions of the first metal sheet being in contact with the whole of the hot and cold edge portions of the second metal sheet, it may be possible for only one or more portions of one of the hot and cold edge portions of the first metal sheet to be in contact with a respective portion of the hot and cold edges of the second metal sheet.

Although the invention has been described with reference to a spiral heat exchanger the invention is applicable to other heat exchangers in which the metal sheets are formed to produce a curve, for example each sheet may be formed into a circle, or an ellipse, and the metal sheets are arranged concentrically. Thus the metal sheets are wound around an axis to produce a spiral heat exchanger or a circular heat exchanger etc.

I claim:

1. A heat exchanger having a hot end and a cold end, the heat exchanger comprising a first sheet and a second sheet, the first and second sheets being wound around an axis, the hot and cold ends of the heat exchanger being arranged at the axial ends of the heat exchanger, each sheet having hot and cold edge portions at the hot and cold ends respectively of the heat exchanger, at least one of the hot and cold edge portions of the first sheet being thinner and having a greater diameter than the remainder of the first sheet such that the at least one of the hot and cold edge portions of the first sheet contacts at least one of the hot and cold edge portions of the second sheet, the hot and cold edge portions of the first sheet being joined to the hot and cold edge portions of the second sheet.

2. A heat exchanger as claimed in claim 1 wherein both of the hot and cold edge portions of the first sheet being thinner and having a greater diameter than the remainder of the first sheet such that both of the hot and cold edge portions of the first sheet contact the hot and cold edge portions of the second sheet.

3. A heat exchanger as claimed in claim 1 wherein the heat exchanger is a primary surface heat exchanger.

4. A heat exchanger as claimed in claim 1 wherein the heat exchanger is a plate fin heat exchanger.

5. A heat exchanger as claimed in claim 4 wherein at least one corrugated sheet is arranged between the first and second sheets.

6. A heat exchanger as claimed in claim 1 wherein the edge portions of the sheets are joined by welded joints, brazed joints, bonded joints, crimped joints or glued joints.

7. A heat exchanger as claimed in claim 1 wherein the first sheet comprises a metal or an alloy.

8. A heat exchanger as claimed in claim 1 wherein the second sheet comprises a metal or alloy.

9. A heat exchanger as claimed in claim 7 wherein the alloy comprises a nickel base alloy or steel.

10. A heat exchanger as claimed in claim 9 wherein the alloy comprises stainless steel.

11. A heat exchanger as claimed in claim 1 wherein the heat exchanger is a spiral heat exchanger, and the first and second sheets are wound in a spiral.

12. A method of manufacturing a heat exchanger, the heat exchanger having a hot end and a cold end, the hot and cold ends of the heat exchanger being arranged at the axial ends of the heat exchanger, comprising forming a first sheet, the first sheet having hot and cold edge portions, thinning at least one of the hot and cold edge portions of the first sheet such that the at least one of the hot and cold edge portions is thinner and longer than the remainder of the first sheet, forming a second sheet, the second sheet having hot and cold edge portions, arranging the first and second sheets around an axis such that the first sheet is within the second sheet and such that the at least one of the hot and cold edge portions of the first sheet has a greater diameter than the remainder of the first sheet such that the at least one of the hot and cold edge portions of the first sheet contacts the at least one of the hot and cold edge portions of the second sheet, and joining the hot and cold edge portions of the first sheet to the hot and cold edge portions of the second sheet.

13. A method as claimed in claim 12 comprising thinning both of the hot and cold edge portions of the first sheet such that both of the hot and cold edge portions are thinner and have a greater diameter than the remainder of the first sheet such that both of the hot and cold edge portions of the first sheet contact the hot and cold edge portions of the second sheet.

14. A method as claimed in claim 12 wherein the heat exchanger is a primary surface heat exchanger.

15. A method as claimed in claim 12 wherein the heat exchanger is a plate fin heat exchanger.

16. A method as claimed in claim 15 comprising placing at least one corrugated sheet between the first and second sheets and winding the first and second sheets and the at least one corrugated sheet into a spiral.

17. A method as claimed in of claim 12 wherein the joining of the edge portions of the first and second sheets comprises welding, brazing, bonding, crimping or gluing.

18. A method as claimed in claim 12 comprising forming the first sheet from a metal or alloy.

19. A method as claimed in claim 12 comprising forming the second sheet from a metal or alloy.

20. A method as claimed in claim 18 wherein the alloy comprises a nickel base alloy or steel.

21. A method as claimed in claim 20 wherein the alloy comprises stainless steel.

22. A method as claimed in claim 12 wherein the thinning of the at least one hot and cold edge portion of the first sheet comprises rolling or hammering.

23. A method as claimed in claim 12 comprising winding the first and metal sheets into a spiral to form a spiral heat exchanger.

* * * * *